Nov. 5, 1957   J. H. RUST   2,811,879
FIXTURE CLAMP
Filed July 9, 1956

INVENTOR.
JAMES H. RUST
BY Fulwider Mattingly & Huntley
ATTORNEYS

United States Patent Office 2,811,879
Patented Nov. 5, 1957

2,811,879

FIXTURE CLAMP

James H. Rust, La Habra, Calif.

Application July 9, 1956, Serial No. 596,548

6 Claims. (Cl. 77—62)

The present invention relates generally to fastening devices and more particularly to a new and novel fixture clamp.

In machine shop practice certain fixtures, as for example, leaf type drill jigs, employ a base member to which is attached a secondary member movable towards and away from the base member. Thus, a leaf type drill jig incorporates a body and a leaf or plate having one of its sides pivotally attached to the body, the free end of the leaf being movable towards and away from the body. It is common practice to temporarily secure the free end of the leaf against movement away from the body by means of a quarter-turn screw. Such screw includes a shank engaged with a threaded bore formed in the base member and a rectangular head. An elongated aperture is formed in the free end of the leaf in alignment with the threaded bore. The head of the quarter-turn screw is narrower than the width of the aperture. With this arrangement, to lock the leaf against the body, the quarter-turn screw is tightened within the threaded bore until the underside of its head abuts the upper surface of the leaf with the head being transversely disposed relative to the elongated aperture. With the quarter-turn screw disposed in this position, the leaf is locked in place by the abutment of the underside of the head with the exterior surface of the leaf. In order to free the leaf for movement away from the base, the quarter-turn screw is backed off a quarter of a turn so that its head is disposed longitudinally relative to the aperture. With this arrangement, the underside of the head of the quarter-turn screw will after a comparatively short period of time gouge the upper surface of the leaf. When this gouging has continued for sometime, the quarter-turn screw will no longer be positively restrained against an unscrewing action. It is then possible for the leaf to become inadvertently disengaged from the base.

It is a major object of the present invention to provide a new and novel fixture clamp.

Another object of the invention is to provide a fixture clamp which will not gouge or otherwise damage the parts with which it is employed.

A further object is to provide a fixture clamp which when once locked will not become inadvertently unlocked.

Yet a further object is to provide a fixture clamp of the aforedescribed nature which may be re-used many times and will thus afford a long service life.

Yet another object is to provide a fixture clamp which is simple in design and rugged of construction.

Yet a further object is to provide a fixture clamp of the aforedescrbied nature which while providing a positive lock will always be readily movable into a released position.

These and other objects and advantages of the present invention will become apparent from the following detailed description, when taken in conjunction with the appended drawings, wherein.

Figure 1:
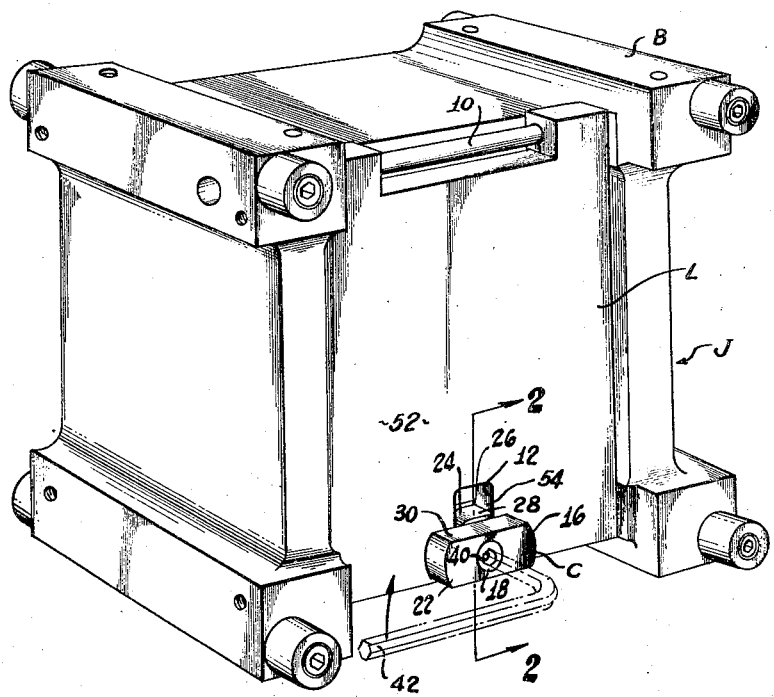
Figure 1 is a perspective view of a leaf type drill jig which employs a preferred form of fixture clamp embodying the present invention.

Referring to the drawings, the preferred form of fixture clamp C embodying the present invention is disclosed in conjunction with a conventional leaf type drill jig J employing a hollow body B, one end of which is covered by a leaf L. The upper end of the leaf L is pivotally attached to the upper end of the body B by means of a shaft 10. The lower or free end of the leaf L is adapted to be locked against relative motion away from the body B by means of the preferred form of fixture clamp C. The lower end of the leaf L is formed with an elongated aperture 12 for receiving the fixture clamp C. This aperture 12 is aligned with a threaded bore 14 formed in the body B.

Figure 4:
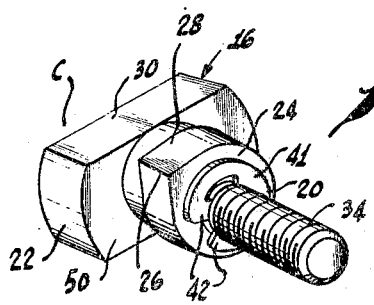
Figure 4 is an enlarged perspective view of said fixture clamp.

The preferred form of fixture clamp C includes a latch of integral construction, generally designated 16, a cap screw 18 and a bowed E-ring 20. The latch member 16 includes an elongated restraining element 22 of smaller width than the aperture 12. A stop dog 24 extends from one side of the restraining element 22. This stop dog 24 is generally tear-drop shaped and includes a point 26. It likewise includes an abutment surface 28 which is generally parallel to the adjacent side 30 of the restraining element 22, as will be apparent from Figures 1 and 4. A passage 32 is formed through the latch 16 terminating in a counterbore 33 formed in the restraining element 22. This passage 32 is somewhat larger in diameter than the diameter of the shank 34 of the cap screw 18, while the counterbore 33 is somewhat larger in diameter than the head 36 of the cap screw.

The cap screw 18 is of conventional construction and its head 36 is formed with a polygonal socket 40 for receiving a wrench 42. The bowed E-ring 20 is also of conventional construction having a semicircular bridge 41 from which radially inwardly directed fingers 42 extend into an annular groove 43 formed in the intermediate portion of the cap screw's shank 36. Once its fingers 42 are engaged with the groove 43 of the cap screw's shank 34, the ring will remain locked upon the shank. In assembling the fixture clamp, the cap screw 18 is inserted through the latch. Next the bowed E-ring is snapped into the annular groove 43.

Figure 2:
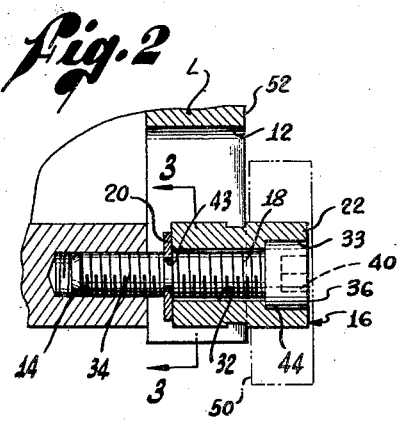
Figure 2 is a vertical sectional view taken along line 2—2 of Figure 1.

In the use of the fixture clamp C, with the shank 34 of the cap screw 18 partially threaded into the bore 14 of the jig body B, the restraining element 22 is disposed transversely of the leaf's slot 12 whereby the leaf may be closed. Next, the wrench 42 will be rotated clockwise relative to Figure 1 until the surface 28 of the stop dog 24 will abut one side wall 54 of the aperture 12, the bowed E-ring 20 causing the rotation of the cap screw 18 to be transferred to the latch 16. When this surface 28 of the latch dog so abuts the aperture side wall 54, the restraining element 22 will be disposed transversely of the aperture 12, as indicated in Figure 1. Referring now to Figure 2, after this abutment of the stop dog 24 with the side wall 54 of the aperture, continued clockwise rotation of the wrench will serve to draw the leaf L tightly against the jig body B. It should be particularly noted that the underside of the restraining element 22 will not gouge the exterior surface 52 of the leaf L as this movement takes place. This is true because the bowed E-ring will then permit relative rotation to occur between the cap screw 18 and the latch 16.

Figure 3:
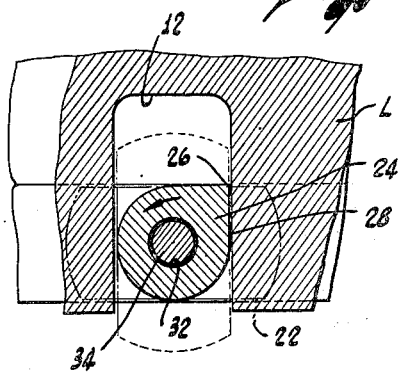
Figure 3 is a vertical sectional view taken along line 3—3 of Figure 2.

Referring now to Figures 1 and 3, when it is desired to move the fixture clamp C to an unlocked position it is only necessary to insert the wrench 42 within the cap screw socket 40 and apply counterclockwise rotation thereto. Such rotation will be transferred to the latch 16 by the bowed E-ring 20. In this manner, the latch 16 will be rotated counterclockwise until the restraining element 16 is positioned parallel with the elongated slot 12, as indicated in dotted outline in Figures 2 and 3. Inasmuch as the width of the restraining element 22 is less than that of the aperture 12, the leaf L may be moved outwardly away from the body B without restraint.

Although the preferred form of fixture clamp has been disclosed in conjunction with a leaf type jig, it may be employed with numerous other forms of devices, as for example, vertical swing clamps, horizontal swing clamps, strap clamps and the like.

Various other modifications and changes may be made with respect to the foregoing detailed description without departing from the spirit of the invention or the scope of the following claims.

I claim:

1. A fixture clamp for use with a base member and a secondary member movable towards and away from said base member, said base member being formed with a threaded bore and said secondary member being formed with an elongated aperture aligned with said bore, comprising: an integral latch having an elongated restraining element of smaller width than said aperture and a stop dog extending from said restraining element and disposed within said aperture, said latch being formed with a passage that merges into a coaxial counterbore formed in said restraining element; a screw element having its head in said counterbore with its shank extending through said passage into said threaded bore; and a rotation-transfer element that yieldingly frictionally engages the shank of said screw element adjacent said stop dog, so as to transfer rotation of said screw element to said latch and thereby effect concurrent rotation of said screw member and latch from a first position wherein said restraining element is arranged parallel to said aperture to a second position wherein said stop dog engages a side wall of said aperture, said restraining element being arranged transversely of said aperture in said second position, said rotation-transfer element permitting continued rotation of said screw element independently of said latch after said latch reaches said second position.

2. A fixture clamp for use with a base member and a secondary member movable towards and away from said base member, said base member being formed with a threaded bore and said secondary member being formed with an elongated aperture aligned with said bore, comprising: an integral latch having an elongated restraining element of smaller width than said aperture and a stop dog extending from said restraining element and disposed within said aperture, said latch being formed with passage means; a screw element rotatably disposed in said passage means with its shank extending into said threaded bore; shoulder means interposed between said screw element and said passage restraining unlimited axial movement of said screw element toward said threaded bore; and a rotation-transfer element yieldingly frictionally engaged with the shank of said screw element adjacent said stop dog so as to transfer rotation of said screw element to said latch and thereby effect concurrent rotation of said screw element and latch from a first position wherein said restraining element is arranged parallel to said aperture to a second position wherein said stop dog engages a side wall of said aperture, said restraining element being arranged transversely of said aperture in said second position, said rotation-transfer element permitting continued rotation of said screw element independently of said latch after said latch reaches said second position.

3. A fixture clamp for use with a base member and a secondary member movable towards and away from said base member, said base member being formed with a threaded bore and said secondary member being formed with an elongated aperture aligned with said bore, comprising: an intgeral latch having an elongated restraining element of smaller width than said aperture and a stop dog extending from said restraining element and disposed within said aperture, said latch being formed with a passage that merges into a coaxial counterbore formed in said restraining element; a screw element having its head in said counterbore with its shank extending through said passage into said threaded bore; and a bowed E-ring that yieldingly frictionally engages the shank of said screw element adjacent said stop dog, so as to transfer rotation of said screw element to said latch and thereby effect concurrent rotation of said screw member and latch from a first position wherein said restraining element is arranged parallel to said aperture to a second position wherein said stop dog engages a side wall of said aperture, said restraining element being arranged transversely of said aperture in said second position, said bowed E-ring permitting continued rotation of said screw element independently of said latch after said latch reaches said second position.

4. A fixture clamp for use with a base member and a secondary member movable towards and away from said base member, said base member being formed with a threaded bore and said secondary member being formed with an elongated aperture aligned with said bore, comprising: an integral latch having an elongated restraining element of smaller width than said aperture and a stop dog extending from said restraining element and disposed within said aperture, said latch being formed with passage means; a screw element rotatably disposed in said passage means with its shank extending into said threaded bore; shoulder means interposed between said screw element and said passage restraining unlimited axial movement of said screw element toward said threaded bore; and a bowed E-ring yieldingly frictionally engaged with the shank of said screw element adjacent said stop dog so as to transfer rotation of said screw element to said latch and thereby effect concurrent rotation of said screw element and latch from a first position wherein said restraining element is arranged parallel to said aperture to a second position wherein said stop dog engages a side wall of said aperture, said restraining element being arranged transversely of said aperture in said second position, said bowed E-ring permitting continued rotation of said screw element independently of said latch after said latch reaches said second position.

5. A fixture clamp for use with a base member and a secondary member movable towards and away from said base member, said base member being formed with a threaded bore and said secondary member being formed with an elongated aperture aligned with said bore, comprising: an integral latch having an elongated restraining element of smaller width than said aperture and a stop dog extending from said restraining element and disposed within said aperture, said stop dog being formed with an abutment surface which is generally parallel to the adjacent side of said restraining element, said latch also being formed with a passage that merges into a coaxial counterbore formed in said restraining element; a screw element having its head disposed in said counterbore with its shank extendable into said threaded bore; and a rotation-transfer element that yieldingly frictionally engages the shank of said screw element adjacent said stop dog so as to transfer rotation of said screw element to said latch and thereby effect concurrent rotation of said screw element and latch from a first position wherein said restraining element is arranged parallel to said aperture to a second position wherein said abutment surface of said stop dog engages said adjacent side wall of said aperture, with said restraining element being arranged transversely of said aperture in said second position, said rotation-transfer element permitting continued rotation of said screw element independently of said latch after said latch reaches said second position.

6. A fixture clamp for use with a base member and a secondary member movable towards and away from said base member, said base member being formed with a threaded bore and said secondary member being formed with an elongated aperture aligned with said bore, comprising: an integral latch having an elongated restraining element of smaller width than said aperture and a stop dog extending from said restraining element and disposed within said aperture, said stop dog being formed with an abutment surface which is generally parallel to the adjacent side of said restraining element, said latch also being formed with passage means; a screw element rotatably disposed in said passage means with its shank extendable into said threaded bore; shoulder means interposed between said screw element and said passage means restraining unlimited axial movement of said screw element toward said threaded bore; and a rotation-transfer element that yieldingly frictionally engages the shank of said screw element adjacent said stop dog so as to transfer rotation of said screw element to said latch and thereby effect concurrent rotation of said screw element and latch from a first position wherein said restraining element is arranged parallel to said aperture to a second position wherein said abutment surface of said stop dog engages said adjacent side wall of said aperture, with said restraining element being arranged transversely of said aperture in said second position, said rotation-transfer element permitting continued rotation of said screw element independently of said latch after said latch reaches said second position.

References Cited in the file of this patent

UNITED STATES PATENTS 2,390,325     Rapp ------------------ Dec. 4, 1945